Patented Nov. 12, 1935

2,020,642

UNITED STATES PATENT OFFICE 2,020,642

MANUFACTURE OF FOILS AND THREADS

Max Hagedorn, Dessau in Anhalt, Germany, assignor to Agfa Ansco Corporation, Binghamton, N. Y., a corporation of New York No Drawing. Application July 6, 1933, Serial No. 679,266. In Germany July 15, 1932

2 Claims. (Cl. 18—57)

My present invention relates to the manufacture of sheets or films and threads and, more particularly, to the manufacture of improved sheets or films and threads from polyvinylchloride.

In my copending application Ser. No. 644,543 filed November 26, 1932, I have described that sheets or films and threads having good properties are obtainable when making these articles from polyvinylchloride having an M-number of at least 15. The M-number is defined as the number of cubic centimeters of a mixture of chlorobenzene and epichlorhydrine mixed in the ratio of 3:1 necessary for dissolving 1 gram of polyvinylchloride at 100° C. (boiling water bath), and keeping the polyvinylchloride in solution for at least 5 minutes without gelatinizing taking place, when the solution is cooled to 20° C.

According to this invention I have found that such polyvinylchlorides are extraordinarily suited for the manufacture or sheets or films and threads having improved properties compared with the films of polyvinylchloride hitherto known, particularly with regard to their flexibility, as have an M-number inferior to 15, if this low value is due to the aftertreatment with chlorine of a polyvinylchloride having an M-number higher than 15. or obtaining such polyvinylchlorides which are particularly suited for the purpose of the invention there is started from a polyvinylchloride having an M-number of 15 to 40 which is treated with chlorine in its solution in tetrachlorethane. The polyvinyl chloride having the desired content of chlorine is quite generally obtainable by subjecting polymerized vinyl chloride to a chlorinating treatment in a solvent or swelling agent for the polyvinylchloride. The polyvinylchlorides used according to this invention are distinguished by a firmly bound content of chlorine exceeding that corresponding with the formula $CH_2:CHCl$.

The following example illustrates the invention:

A polyvinyl chloride containing 63 per cent. of chlorine is dissolved in a mixture of equal parts of benzene and acetone to a solution of 25 per cent. strength. This solution is cast on a casting machine fitted with an endless casting surface, from which, after evaporation of the solvent, the film obtained is removed, dried, and coated with an adhesive layer. Then the film is coated with a light sensitive photographic layer.

What I claim is:

1. In the manufacture of sheets and threads from polyvinyl chloride the step which comprises casting a solution of an after-chlorinated polymerized vinyl chloride containing a firmly bound quantity of chlorine surpassing that corresponding with the formula $CH_2:CHCl$ and needing for dissolution of 1 gram less than 15 cc. of a mixture of chlorobenzene and epichlorhydrine mixed in the ratio 3:1 at 100° C., said mixture keeping said polyvinylchloride in solution for at least 5 minutes when cooled to 20° C.

2. Sheets and threads made from an after-chlorinated polymerized vinyl chloride containing a firmly bound quantity of chlorine surpassing that corresponding with the formula $CH_2:CHCl$ and needing for dissolution of 1 gram less than 15 cc. of a mixture of chlorobenzene and epichlorhydrine mixed in the ratio 3:1 at 100° C., said mixture keeping said polyvinylchloride in solution for at least 5 minutes when cooled to 20° C.

MAX HAGEDORN.